(12) United States Patent
Suh et al.

(10) Patent No.: US 7,991,352 B2
(45) Date of Patent: Aug. 2, 2011

(54) METHOD AND APPARATUS FOR AUTOMATIC REPEAT REQUEST IN A MULTI-HOP BROADBAND WIRELESS COMMUNICATION SYSTEM

(75) Inventors: Kyung-Joo Suh, Seoul (KR); Dae-Gyun Kim, Seangnam-si (KR); Beom-Sik Bae, Suwon-si (KR); Jung-Won Kim, Seoul (KR); June Moon, Seoul (KR)

(73) Assignee: Samsung Electronics Co., Ltd (KR)

( * ) Notice: Subject to any disclaimer, the term of this patent is extended or adjusted under 35 U.S.C. 154(b) by 679 days.

(21) Appl. No.: 11/851,081

(22) Filed: Sep. 6, 2007

(65) Prior Publication Data

US 2008/0081554 A1 Apr. 3, 2008

(30) Foreign Application Priority Data

Sep. 6, 2006 (KR) ........................ 10-2006-0085573

(51) Int. Cl.
*H04B 3/36* (2006.01)

(52) U.S. Cl. .............. 455/8; 455/7; 455/11.1; 455/13.1; 370/315; 370/405

(58) Field of Classification Search ............. 455/7, 11.1, 455/13.1, 8, 24; 370/315, 405–408
See application file for complete search history.

(56) References Cited

U.S. PATENT DOCUMENTS

| 5,699,367 | A * | 12/1997 | Haartsen | 714/749 |
| 7,577,399 | B2 * | 8/2009 | Eichinger et al. | 455/11.1 |
| 2002/0114302 | A1 * | 8/2002 | McDonald et al. | 370/338 |
| 2006/0183421 | A1 * | 8/2006 | Proctor et al. | 455/11.1 |
| 2007/0286110 | A1 * | 12/2007 | Proctor et al. | 370/315 |
| 2008/0285499 | A1 * | 11/2008 | Zhang et al. | 370/315 |
| 2008/0305740 | A1 * | 12/2008 | Horiuchi et al. | 455/11.1 |
| 2009/0003378 | A1 * | 1/2009 | Sachs | 370/466 |
| 2009/0073916 | A1 * | 3/2009 | Zhang et al. | 370/315 |
| 2009/0080351 | A1 * | 3/2009 | Ryu et al. | 370/312 |

FOREIGN PATENT DOCUMENTS

| KR | 1020020037713 | 5/2002 |
| KR | 1020060067327 | 6/2006 |
| WO | WO 2006/070992 | * 7/2006 |

* cited by examiner

*Primary Examiner* — Edward Urban
*Assistant Examiner* — Fayyaz Alam
(74) *Attorney, Agent, or Firm* — The Farrell Law Firm, P.C.

(57) ABSTRACT

A retransmission method and apparatus in a multi-hop broadband wireless communication system are provided, in which if there is a failed data block among data blocks received from a source node, a Relay Station (RS) transmits a feedback message requesting retransmission of the failed data block to the source node, transmits a successfully received data block to a destination node, receives a retransmitted data block for the failed data block from the source node, transmits the received retransmitted data block to the destination node, receives from the destination node a feedback message about data blocks transmitted to the destination node, and transmits the feedback message to the source node.

14 Claims, 7 Drawing Sheets

METHOD AND APPARATUS FOR AUTOMATIC REPEAT REQUEST IN A MULTI-HOP BROADBAND WIRELESS COMMUNICATION SYSTEM

PRIORITY

This application claims priority under 35 U.S.C. §119(a) to a Korean Patent Application filed in the Korean Intellectual Property Office on Sep. 6, 2006 and assigned Serial No. 2006-85573, the entire disclosure of which is hereby incorporated by reference.

BACKGROUND OF THE INVENTION

1. Field of the Invention

The present invention generally relates to a method and apparatus for retransmitting data in a broadband wireless communication system, and in particular, the present invention relates to a method and apparatus for retransmitting data in a multi-hop communication system in which data is transmitted via a Relay Station (RS).

2. Description of the Related Art

The need for a communication system that efficiently provides Internet service has become pressing along with today's development of the communication industry and ever increasing user demands for Internet service. As legacy communication networks were designed mainly for voice service, they suffer from relatively narrow transmission bandwidths and high use cost. To overcome this problem, Orthogonal Frequency Division Multiplexing (OFDM) is under active study as a promising broadband transmission technology.

OFDM is a special case of multi-carrier modulation in which a plurality of orthogonal subcarriers are overlapped with one another. In OFDM, an input serial symbol sequence is converted to parallel symbol sequences and modulated to orthogonal subcarriers, prior to transmission. OFDM finds its various applications in digital transmission technology including Digital Audio Broadcasting (DAB), digital television, Wireless Local Area Network (WLAN), etc. Due to robustness against multipath fading, OFDM is expected to provide an efficient platform for high-speed data transmission.

An Orthogonal Frequency Division Multiple Access (OFDMA) system, which has recently attracted attention, is a multiple access system based on OFDM. It divides a frequency domain into subchannels each having a plurality of subcarriers and divides a time domain into a plurality of time slots. As time-frequency resources are allocated to users in units of subchannels, the OFDMA system can accommodate multiple users with limited frequency resources.

One of the international standardization organizations, the Institute of Electrical and Electronics Engineers (IEEE) 802.16 group has proposed IEEE 802.16e as a standard of providing a broadband wireless Internet service to Mobile Stations (MSs) in a Broadband Wireless Access (BWA) communication system such as the OFDMA system. The IEEE 802.16e standard enables transmission of more data for a shorter time due to a wider transmission bandwidth, compared to conventional wireless technologies aiming at voice service.

A mobile communication system for high-speed packet service such as the OFDMA system generally uses Automatic Repeat reQuest (ARQ) in which an MS notifies a Base Station (BS) of successful or failed reception of a packet transmitted from the BS in order to provide stable data transmission and the BS retransmits a failed packet to the MS. ARQ is one of several link control protocols, in which, when a received packet has errors, the MS requests retransmission of the packet to the BS.

To increase data rate and expand service coverage, a multi-hop technology is also under development for the high-speed packet data system. The multi-hop technology is a transmission technology that transmits data from a source node to a destination node via a Relay Station (RS) to thereby offer higher data rates and cover a large service area at a small cost.

The afore-mentioned IEEE 802.16 OFDMA standard is also under study in relation to the multi-hop technology. According to proposals made so far, ARQ is considered for reliable data transmission and reception in a Point-to-Multi-Point (PMP) environment between a Base Station (BS) and a Mobile Station (MS). However, there are no specified ARQ mechanisms and messages associated with a Relay Station (RS), in the case where the RS is added between the BS and the MS.

When an IEEE 802.16e-based multi-hop system is designed, consideration should be given to ARQ status management between the BS and the RS or between the RS and the MS. With no regard to the ARQ status management, data transmission and reception would be inefficient and retransmission of the same data would cause resource waste. Moreover, a delay involved in monitoring the status of the RS or the MS by the BS leads to an overall system delay.

SUMMARY OF THE INVENTION

An aspect of the present invention is to address at least the above problems and/or disadvantages and to provide at least the advantages described below. Accordingly, an aspect of the present invention is to provide a method and apparatus for efficiently retransmitting data in a multi-hop broadband wireless communication system.

Another aspect of the present invention is to provide a method and apparatus for retransmitting data through efficient use of a buffer of an RS in a multi-hop broadband wireless communication system.

A further aspect of the present invention is to provide a method and apparatus for retransmitting data with a minimized transmission delay in a multi-hop broadband wireless communication system.

In accordance with an aspect of the present invention, there is provided a retransmission method of an RS in a multi-hop wireless communication system, in which if there is a failed data block among data blocks received from a source node, the RS transmits a feedback message requesting retransmission of the failed data block to the source node, transmits a successfully received data block to a destination node, receives a retransmitted data block for the failed data block from the source node, transmits the received retransmitted data block to the destination node, receives from the destination node a feedback message about data blocks transmitted to the destination node, and transmits the feedback message to the source node.

In accordance with another aspect of the present invention, there is provided a retransmission apparatus of an RS in a multi-hop wireless communication system, in which a receiver receives data blocks from a source node and a feedback message from a destination node and classifies the data blocks and the feedback information, a source node processor interprets the data blocks and generating a feedback message to be transmitted to the source node based on the interpretation, a transmission data processor processes the data blocks received from the source node, for transmission to the destination node, a destination node processor interprets the feedback message received from the destination node, requests retransmission data blocks to the transmission data processor based on the interpretation, and processes the feedback message received from the destination node, for transmission to the source node, a data/feedback controller schedules transmission of the data blocks for the destination node and the feedback message for the source node, and a transmitter transmits an output of the data/feedback controller to one of the source node and the destination node.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

For better understanding of the present invention, a description will be made below of an operation for transmitting ARQ blocks from a source node to a destination node and feeding back information about the reception status of the ARQ blocks by the destination node in a broadband wireless communication system such as an IEEE 802.16 system.

Figure 1:
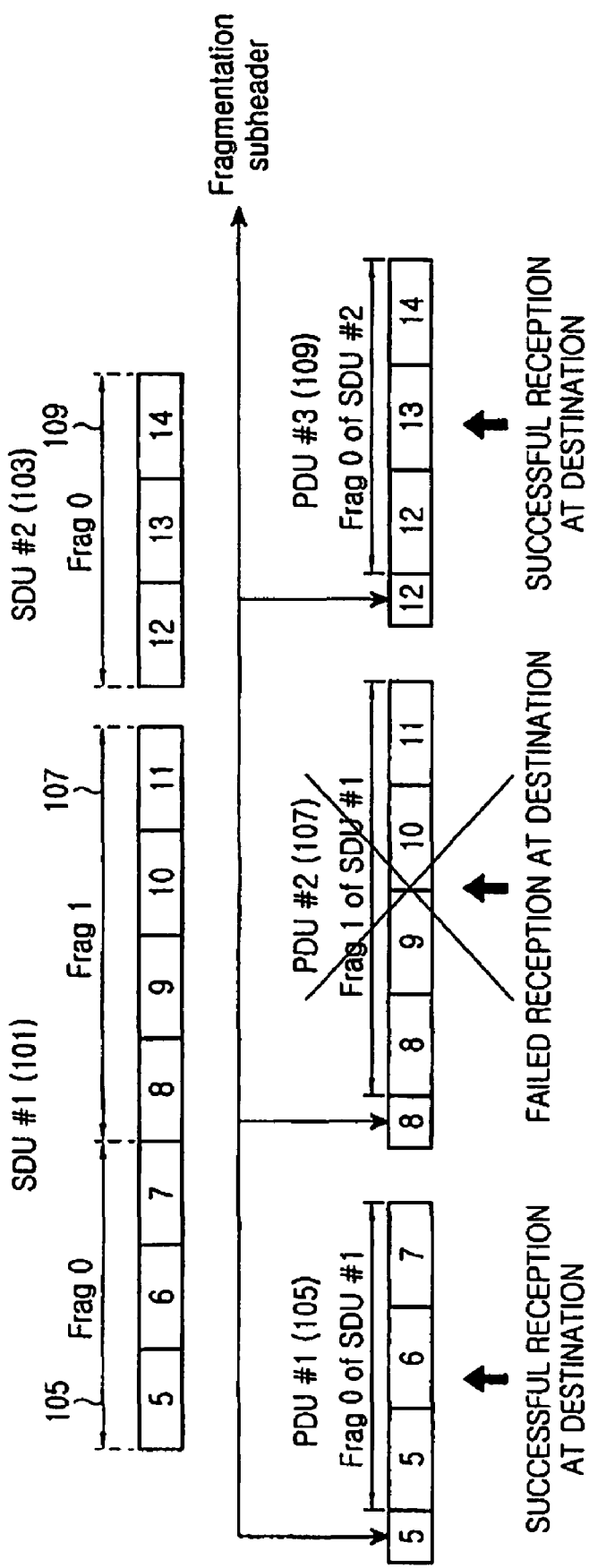
FIG. 1 illustrates an exemplary ARQ block transmission/reception in a conventional broadband wireless communication system.

FIG. 1 illustrates an exemplary ARQ block transmission/reception in a conventional broadband wireless communication system.

In the illustrated case of FIG. 1, two Service Data Units (SDUs) 101 and 103 (SDU #1 and SDU #2) directed from a source node to a destination node are fragmented into three Packet Data Units (PDUs) 105, 107 and 109 (PDU #1, PDU #2 and PDU #3), for transmission. The destination node successfully receives PDU #1 and PDU #3, whereas it fails to receive PDU #2.

Figure 2:
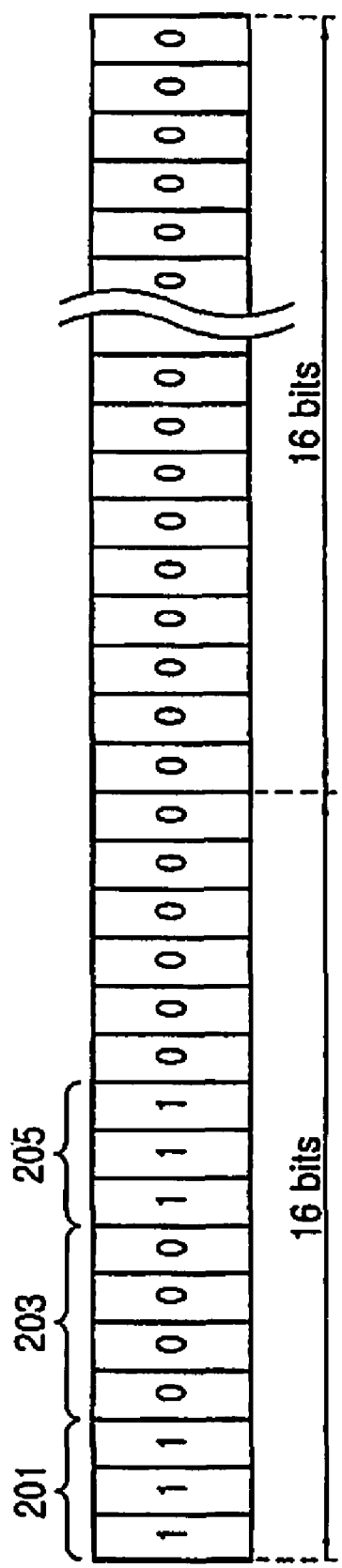
FIG. 2 illustrates an exemplary selective ACK Map in the situation described in FIG. 1.

In this situation, the destination node generates a selective ACK Map as illustrated in FIG. 2 and transmits it to the source node. Each bit in the selective ACK Map indicates whether an ARQ block represented by the bit has been successfully received. For example, if the bit is '1', this implies successful reception of the ARQ block and if the bit is '0', this implies failed reception of the ARQ block. In FIG. 2, three bits 201 set to '111' indicate that blocks with Block Sequence Numbers (BSNs) 5, 6 and 7 illustrated in FIG. 1 have been successfully received. The following four bits 203 set to '0000' indicate failed reception of blocks with BSNs 8 to 11. The three bits 205 set to '111' next to the bits 203 indicate successful reception of blocks with BSNs 12, 13 and 14. The remaining bits are padded bits of all 0s.

As to the selective ACK Map illustrated in FIG. 2, if the Number of ACK Maps is set to 0x0=1, a total ACK map size is 32 bits being the smallest size, because two selective ACK Maps each having 16 bits are inserted. If the Number of ACK Maps is set to 0x3=4, the total ACK Map size is 80 bits being the largest size because five selective ACK Maps each having 16 bits are inserted. The destination node notifies of the reception statuses of ARQ blocks by an ARQ feedback message (ARQ_Feedback_Message) having the configuration illustrated in Table 1. The ARQ_Feedback_Message is transmitted with a generic Medium Access Control (MAC) header.

TABLE 1

| Syntax | Size |
|---|---|
| ARQ_Feedback_Message_Format( ){ | |
|    Management Message Type=33 | 8 bits |
|    ARQ_Feedback_Payload | Variable |
| } | |

In Table 1, Management Message Type=33, which identifies the ARQ_Feedback_Message. The format of ARQ_Feedback_Payload is defined in Table 2.

TABLE 2

| Syntax | Size | Notes |
|---|---|---|
| ARQ_Feedback_Payload_Format( ){ | | |
|   do | | |
|     ARQ_Feedback_IE | Variable | Insert as many as desired until LAST==TRUE |
|   Until (last) | | |
| } | | |

As noted from Table 2, ARQ_Feedback_Payload_Format includes a plurality of ARQ_Feedback_IEs configured as illustrated in Table 3 and Table 4.

TABLE 3

| Syntax | Size | Notes |
|---|---|---|
| ARQ_Feedback_IE(LAST){ | | Variable |
|   CID | 16 bits | The ID of the connection being referenced |

TABLE 3-continued

| Syntax | Size | Notes |
|---|---|---|
| LAST | 1 bit | 0 = More ARQ Feedback IBs in list |
| | | 1 = Last ARQ Feedback IE in list |
| ACK Type | 2 bits | 0x0 = Selective ARQ entry |
| | | 0x1: Cumulative ACK entry |
| | | 0x2 = Cumulative with Selective entry |
| | | 0x3 = Cumulative ACK with Block Sequence ACK entry |
| BSN | 11 bits | |
| Number of ACK Maps | 2 bits | If ACK Type==01, the field is reserved and set to 00. Otherwise the field indicates the number of ACK maps: |
| | | 0x0 = 1, 0x1 = 2, 0x2 = 3, 0x3 = 4 |

TABLE 4

```
If(ACKType!=01){
    For  (i=0;i<Number of ACK
maps+1:++1) {
        If(ACKType!=3){
            Selective ACK. Map        16  bits
        }
        Else{                                    Start of Block Sequence ACK
                                                 Map definition (16 bits)
            Sequence Format          1 bit      Number of block sequences
                                                 associated with descriptor
                                                 0: 2 block sequences
                                                 1: 3 block sequences
            If(Sequence Format=0){
                Sequence ACK Map     2 bits
                Sequence 1 Length    6 bits
                Sequence 2 Length    6 bits
                Reserved             1 bits
            }
            Else {
                Sequence ACK Map     3 bits
                Sequence 1 Length    4 bits
                Sequence 2 Length    4 bits
                Sequence 3 Length    4 bits
            }
        }                                        End of Block Sequence ACK
                                                 Map definition
    }
 }
}
```

When the selective ACK Map is configured as illustrated in FIG. 2 in the situation illustrated in FIG. 1, ARQ_Feedback_IE is given as follows.

TABLE 5

| IE | Description |
|---|---|
| CID = ###### | |
| LAST = 1 | Indicates last ARQ feedback IE |
| ACK Type = 0x0 | Selective ACK entry is used |
| BSN = 5 | The lowest of BSNs of blocks represented by ACK map |
| Number of ACK Maps = 0x0 | Total ACK map size is 32 bits |
| Selective ACK Map = 1110 0001 1100 0000 0000 0000 0000 0000 | |

Figure 3:
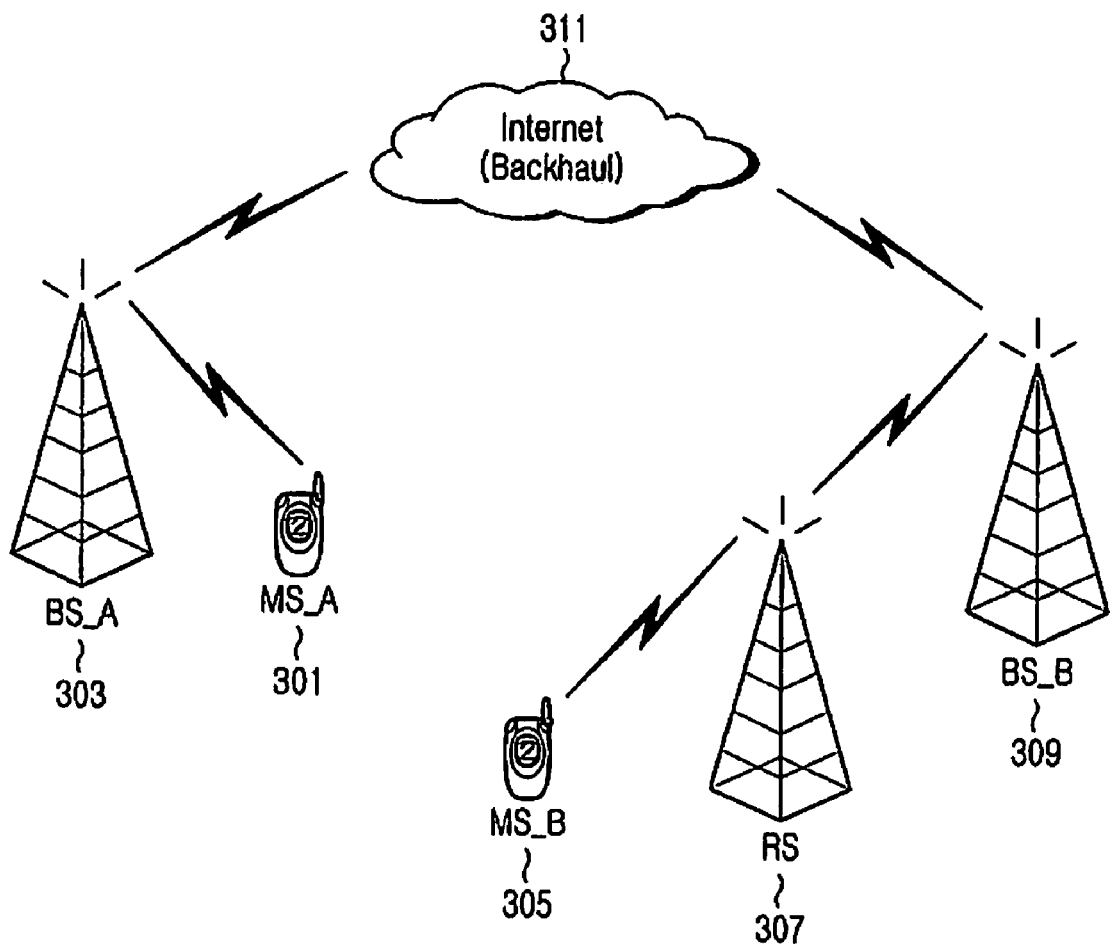
FIG. 3 illustrates the configuration of a multi-hop broadband wireless communication system to which the present invention is applied.

FIG. 3 illustrates the configuration of a multi-hop broadband wireless communication system to which the present invention is applied.

Referring to FIG. 3, a BS 303 (BS_A) and an MS 301 (MS_A) refer to an old BS and an old MS used in a legacy system, and a BS 309 (BS_B) and an MS 305 (MS_B) refer to a new BS and MS with a multi-hop function according to the present invention. A source node, MS_A is connected to a backbone network 311 via a destination node, BS_A. MS_B is connected to BS_B and then to the backbone network 311 via an RS 307. MS_B exchanges data with BS_B via the RS 307 equipped with a relay function. MS_A should be able to transmit and receive control messages to and from BS_B via the RS 307. That is, MS_A should be able to communicate data with the RS 307 as with a BS.

Figure 4:
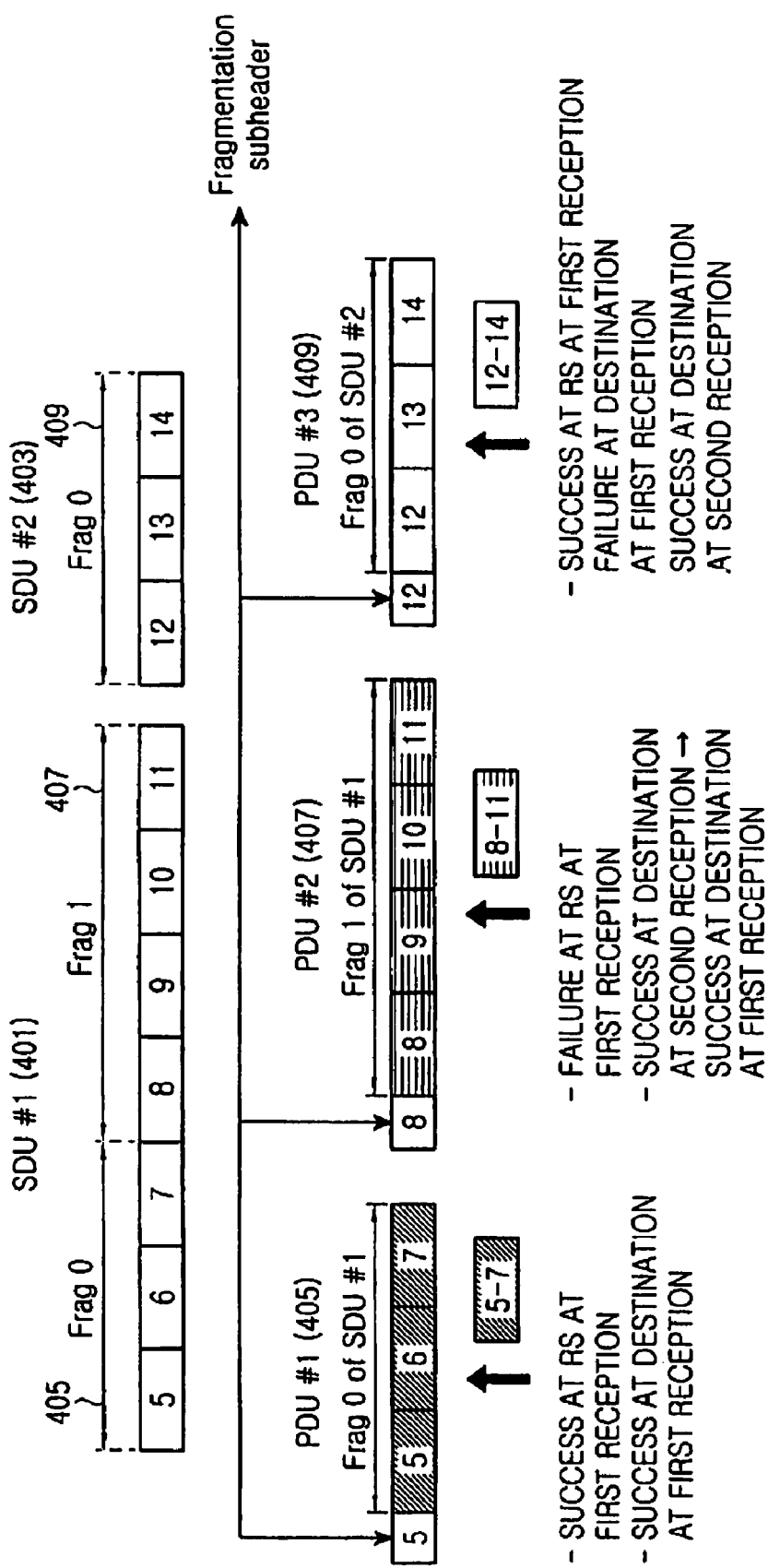
FIG. 4 illustrates ARQ block transmission/reception in the multi-hop broadband wireless communication system according to an exemplary embodiment of the present invention.

FIG. 4 illustrates ARQ block transmission/reception in the multi-hop broadband wireless communication system according to an exemplary embodiment of the present invention.

In the illustrated case of FIG. 4, two SDUs 401 and 403 (SDU #1 and SDU #2) directed from a source node to a destination node are fragmented into three PDUs 405, 407 and 409 (PDU #1, PDU #2 and PDU #3), for transmission. PDU #1 is successfully received in both an RS and the destination node at an initial transmission. PDU #2 is successfully received at the destination node but fails in the RS at an initial transmission. PDU #3 is successfully received in the RS but fails in the destination node at an initial transmission.

Figure 5:
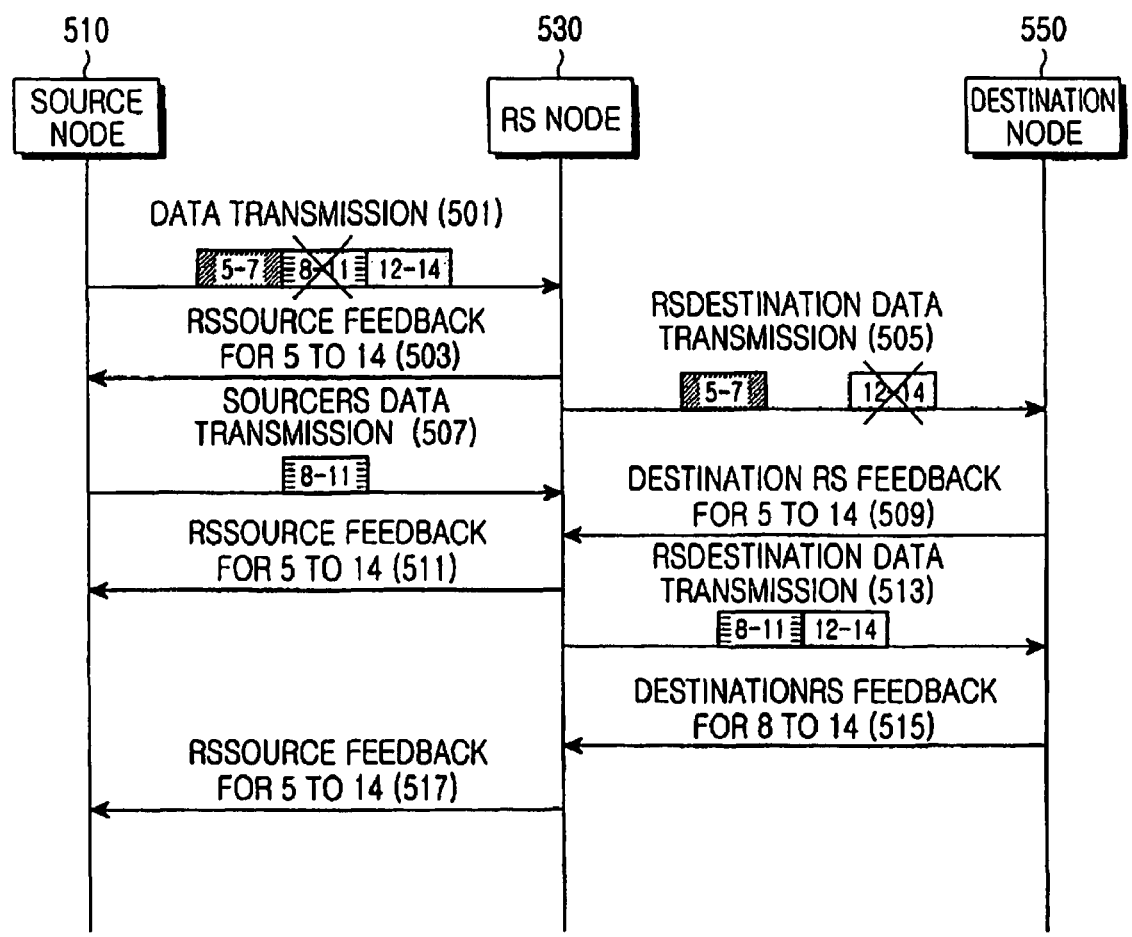
FIG. 5 is a diagram illustrating a signal flow for an ARQ block retransmission operation in the multi-hop broadband wireless communication system according to an exemplary embodiment of the present invention.

FIG. 5 is a diagram illustrating a signal flow for an ARQ block retransmission operation in the multi-hop broadband wireless communication system according to an exemplary embodiment of the present invention. The ARQ block retransmission operation applies to the case illustrated in FIG. 4, by way of example.

Referring to FIG. 5, a source node 510 transmits ARQ blocks in PDU #1, PDU #2 and PDU #3 to an RS 530 and the RS 530 fails to receive PDU #2 in step 501. In step 503, the RS 530 transmits an RS ARQ feedback message (RS_ARQ_Feedback_Message) with RS_ARQ_Feedback_IE (configured as described later) to the source node 510, requesting retransmission of PDU #2. Management Message Type in RS_ARQ_Feedback_Message_Format is set to, for example, To Be Determined (TBD). To transmit the successfully received PDU #1 and PDU #3 to a destination node 550, the RS 530 transmits the data to the destination node 550 in step 505. As illustrated in FIG. 4, it is assumed that the destination node 550 fails to receive PDU #3 that the RS 530 has successfully received from the source node 510 and relayed to the destination node 550.

Meanwhile, upon receipt of the RS_ARQ_Feedback_Message in step 503, the source node 510 recognizes that the RS 530 has failed to receive ARQ blocks with BSNs 8 to 11 and retransmits the ARQ blocks with BSNs 8 to 11 to the RS 530 in step 507.

In step 509, the destination node 550 transmits an ARQ_Feedback_Message about PDU #1, PDU #2 and PDU #3 to the RS 530, notifying failed reception of PDU #3. Because the destination node 550 did not transmit PDU #2, the ARQ_Feedback_Message may not include feedback information about PDU #2. Management Message Type of the ARQ_Feedback_Message is set to 33 in order to indicate that the ARQ_Feedback_Message is an ARQ feedback message transmitted by the destination node 550.

When successfully receiving PDU #2 from the source node 510, the RS transmits an RS_ARQ_Feedback_Message indicating the successful reception of PDU #2 to the source node 510 in step 511 and relays the retransmitted PDU #2 together with PDU #3 for which a Negative ACKnowledgement (NACK) has been received to the destination node 550 in step 513.

In accordance with an exemplary embodiment of the present invention, the RS 530 basically transmits ARQ blocks in an ascending order of BSNs, with the ARQ blocks with BSNs 8 to 11 retransmitted by the source node 510 earlier than the ARQ blocks with BSNs 12, 13 and 14. However, if the RS 530 has not received the retransmitted ARQ blocks yet from the source node 510 and thus are not ready to transmit the ARQ blocks with lower BSNs, it can transmit the ARQ blocks with higher BSNs first.

In step 515, the destination node 550 transmits an ARQ_Feedback_Message about PDU #2 and PDU #3 received in steps 513 to the RS 530. The RS 530 recognizes from the ARQ_Feedback_Message that the destination node 550 has successfully received the ARQ blocks with BSNs 8 to 14. In step 517, the RS 530 configures an RS_ARQ_Feedback_Message by checking the data received from the source node 510 and feedback information about the data transmitted to the destination node 550 and transmits the RS_ARQ_Feedback_Message to the source node 510. The source node 510 then finds out that the destination node 550 has successfully received the ARQ blocks with BSNs 5 to 14, from the RS_ARQ_Feedback_Message.

RS_ARQ_Feedback_IE is configured as illustrated in Table 10 in the RS_ARQ_Feedback_Message transmitted to the source node 510 in step 517 in order to notify the source node 510 of the feedback information from the destination node 550 and the current status of the RS 530. The RS_ARQ_Feedback_Message has Management Message Type set to a TBD value in RS_ARQ_Feedback_Message_Format to indicate that this message is a newly defined RS ARQ feedback message.

In the exemplary embodiment of the present invention, if an old MS acts as a source node, it neglects the new RS ARQ feedback message. As a result, the old MS receives a NACK signal generated by the destination node 550 with regard to data that the RS 530 has failed to receive, or retransmits the failed data after waiting until a retry timeout occurs.

The RS_ARQ_Feedback_Message serves two purposes in the present invention. One of the purposes is to provide feedback information about data received from the source node, and the other purpose is to provide feedback information about data received from the source node to the RS together with feedback information from the destination node.

RS_ARQ_Feedback_Messages serving the two purposes can be discriminated by setting Management Message Type to different TBD values. If the RS_ARQ_Feedback_Message is a simple feedback for data received from the source node, CID is set to an RS CID. If the RS_ARQ_Feedback_Message includes feedback information about data transmitted to the RS and the MS, CID is set to include both the RS CID and an MS CID. Alternatively, CID can be set to only the MS CID. In this case, since Management Message Type is set to a predetermined value indicating that the RS_ARQ_Feedback_Message includes both feedback information about the RS and the MS, the use of the RS_ARQ_Feedback_Message can be identified.

With reference to Table 6 to Table 10, the RS_ARQ_Feedback_Messages defined according to the present invention in the procedure of FIG. 5 will be described.

The RS_ARQ_Feedback_Message transmitted from the RS 530 to the source node 510 in step 503 of FIG. 5 includes the following information, for example.

TABLE 6

| IE | Description |
|---|---|
| CID = ###### | RS CID |
| LAST = 1 | Indicates last ARQ feedback IE |
| ACK Type = 0x0 | Selective ACK entry |
| BSN = 5 | The lowest of BSNs of blocks represented by ACK map |
| Number of ACK Maps = 0x0 | Total ACK maps size is 32 bits |
| Selective ACK Map = 1110 0001 1100 0000 0000 0000 0000 0000 | |

The ARQ_Feedback_Message transmitted from the destination node 550 to the RS 530 in step 509 of FIG. 5 includes the following information, for example.

TABLE 7

| IE | Description |
|---|---|
| CID = ###### | CID of Destination node |
| LAST = 1 | Indicates last ARQ feedback IE |
| ACK Type = 0x0 | Selective ACK entry |
| BSN = 5 | The lowest of BSNs of blocks represented by ACK map |
| Number of ACK Maps = 0x0 | Total ACK maps size is 32 bits |
| Selective ACK Map = 1110 0000 0000 0000 0000 0000 0000 0000 | |

The RS_ARQ_Feedback_Message transmitted from the RS 530 to the source node 510 in step 511 of FIG. 5 includes the following information, for example.

TABLE 8

| IE | Description |
|---|---|
| CID = ###### | RS CID |
| LAST = 1 | Indicates last ARQ feedback IE |
| ACK Type = 0x0 | Selective ACK entry |
| BSN = 5 | The lowest of BSNs of blocks represented by ACK map |
| Number of ACK Maps = 0x0 | Total ACK maps size is 32 bits |
| Selective ACK Map = 1111 1111 1100 0000 0000 0000 0000 0000 | |

The ARQ_Feedback_Message transmitted from the destination node 550 to the RS 530 in step 515 of FIG. 5 includes the following information, for example.

TABLE 9

| IE | Description |
|---|---|
| CID = ###### | CID of Destination node |
| LAST = 1 | Indicates last ARQ feedback IE |
| ACK Type = 0x0 | Selective ACK entry |
| BSN = 5 | The lowest of BSNs of blocks represented by ACK map |
| Number of ACK Maps = 0x0 | Ttotal ACK maps size is 32 bits |
| Selective ACK Map = 1110 1110 0000 0000 0000 0000 0000 0000 | |

The RS_ARQ_Feedback_Message transmitted from the RS 530 to the source node 510 in step 517 of FIG. 5 includes the following information, for example.

TABLE 10

| IE | Description |
|---|---|
| CID = ###### | CID of Destination node and RS CID are included |
| LAST = 1 | Indicates last ARQ feedback IE |
| ACK Type = 0x0 | Selective ACK entry |
| BSN = 5 | The lowest of BSNs of blocks represented by ACK map |
| Number of ACK Maps = 0x0 | Total ACK maps size is 32 bits |
| Selective ACK Map = 1111 1111 1100 0000 0000 0000 0000 0000 | |

Figure 6:
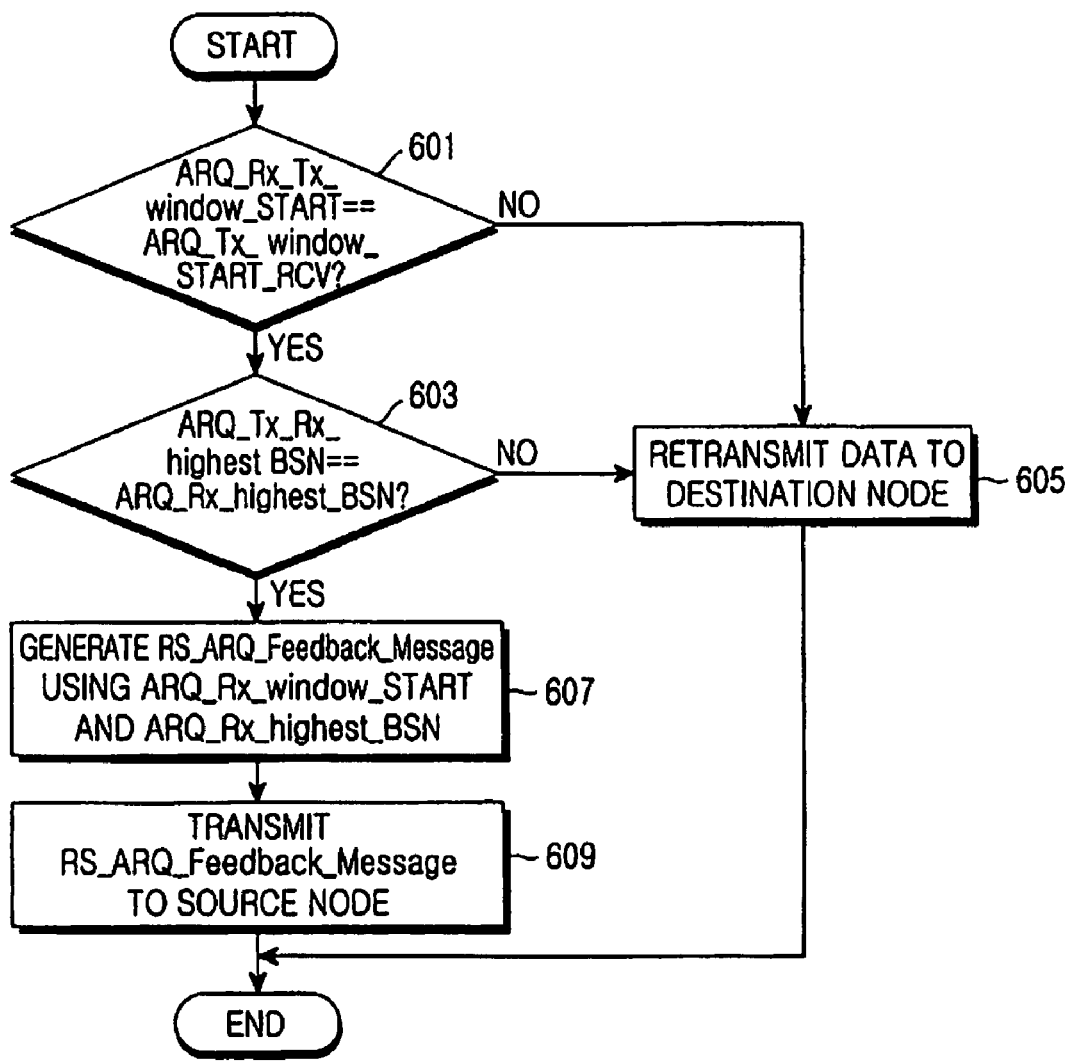
FIG. 6 is a flowchart of an operation for generating and transmitting an RS_ARQ_Feedback_Message in an RS in the multi-hop broadband wireless communication system according to an exemplary embodiment of the present invention.

The RS configures an RS_ARQ_Feedback_Message to be transmitted to the source node in the procedure of FIG. 6, for which the following parameters are introduced.

TABLE 11

| Parameter | Description |
|---|---|
| ARQ_Rx_Tx_window_start | The lowest BSN of blocks that the RS has received from the source node and transmitted to the destination node |
| ARQ_Tx_window_start_Rcv | The lowest BSN of transmitted blocks for which the RS has received ACKs from the destination node |
| ARQ_Tx_Rx_highest_BSN | The highest BSN of transmitted blocks for which the RS has received ACKs from the destination node |
| ARQ_Rx_highest_BSN | The highest BSN of blocks that the RS has received from the source node |
| ARQ_Rx_window_START | The lowest BSN of blocks that the RS has received from the source node |

FIG. 6 is a flowchart of an operation for generating and transmitting an RS_ARQ_Feedback_Message in an RS in the multi-hop broadband wireless communication system according to an exemplary embodiment of the present invention. The RS_ARQ_Feedback_Message is created using the parameters defined in Table 11.

Referring to FIG. 6, the RS compares ARQ_Rx_Tx_window_start with ARQ_Tx_window_start_Rcv in step 601. If ARQ_Rx_Tx_window_start is equal to ARQ_Tx_window_start_Rcv, the RS compares ARQ_Tx_Rx_highest_BSN with ARQ_Rx_highest_BSN in step 603. If the two values are different in step 601 or step 603, the RS retransmits data received from the source node to the destination node in step 605. If ARQ_Tx_Rx_highest_BSN is equal to ARQ_Rx_highest_BSN, the RS generates an RS_ARQ_Feedback_Message using ARQ_Rx_window_START and ARQ_Rx_highest_BSN in step 607 and transmits it to the source node in step 609. Table 12 lists the values of the parameters that are compared before the RS_ARQ_Feedback_Message is transmitted in step 517 of FIG. 5.

TABLE 12

| Parameter | Value |
|---|---|
| ARQ_Rx_Tx_window_start | 8 |
| ARQ_Tx_window_start_Rcv | 8 |
| ARQ_Tx_Rx_highest_BSN | 14 |
| ARQ_Rx_highest_BSN | 14 |
| ARQ_Rx_window_START | 5 |

Figure 7:
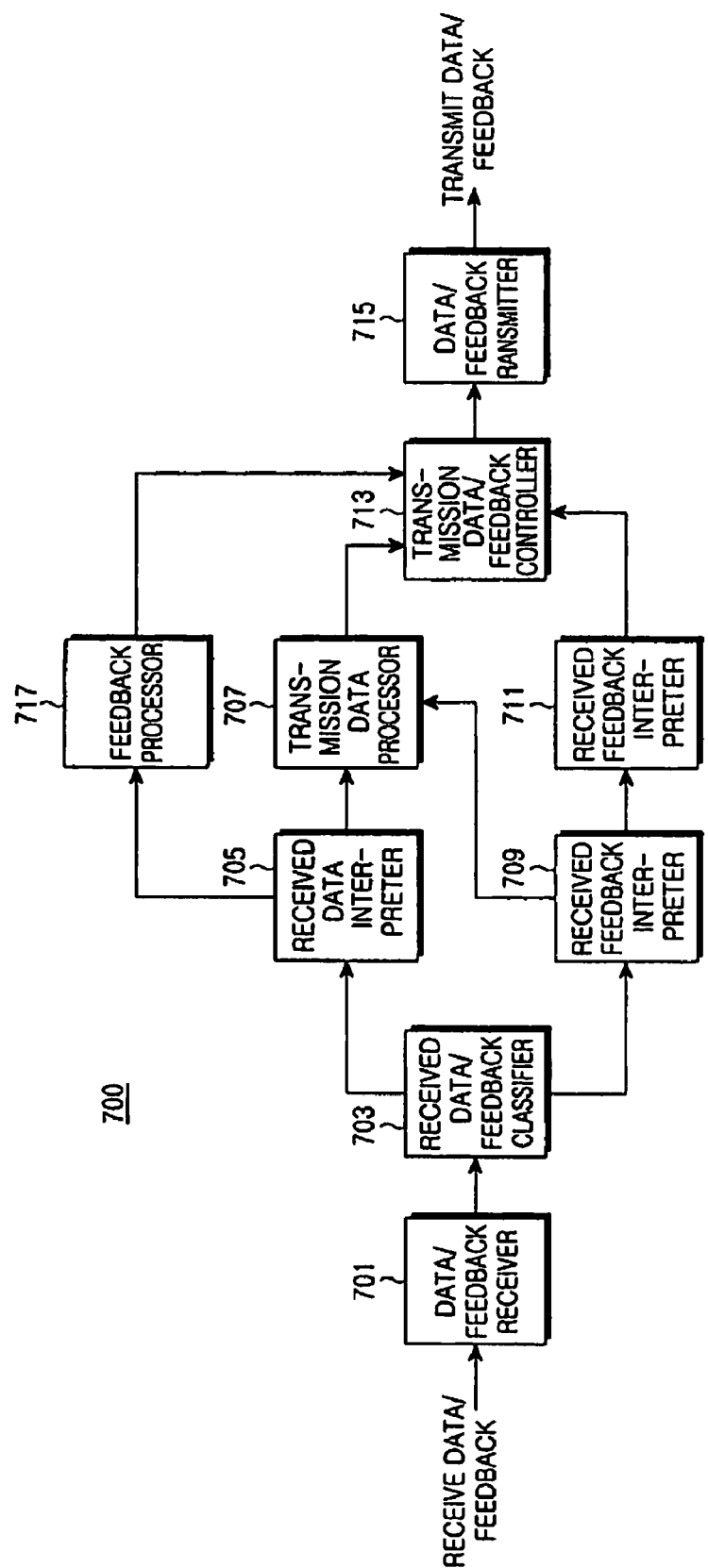
FIG. 7 is a block diagram of the RS in the multi-hop broadband wireless communication system according to an exemplary embodiment of the present invention.

FIG. 7 is a block diagram of the RS in the multi-hop broadband wireless communication system according to an exemplary embodiment of the present invention.

Referring to FIG. 7, upon receiving data/feedback, a data/feedback receiver 701 downconverts data blocks and the feedback message received in Radio Frequency (RF) signals to baseband signals and provides the downconverted data/feedback information to a received data/feedback classifier 703. The received data/feedback classifier 703 identifies whether the received data/feedback information is data from the source node or feedback information from the destination node. If the received data/feedback information is data, the received data/feedback classifier 703 provides the data to a received data interpreter 705. If the received data/feedback information is feedback information, the received data/feedback classifier 703 provides the feedback information to a received feedback interpreter 709.

The received data interpreter 705 determines whether the data has successfully been received and provides the data to a feedback processor 717 and a transmission data processor 707.

The transmission data processor 707 processes successfully received data to be transmitted to the destination node. Meanwhile, the feedback processor 717 processes an RS_ARQ_Feedback message for fast retransmission of failed data.

A transmission data/feedback controller 713 manages transmission scheduling of data and an RS_ARQ_Feedback message. Thus, it schedules the data for the destination node received from the transmission data processor 707 and the RS_ARQ_Feedback message for the source node received from the feedback processor 717.

A data/feedback transmitter 715 transmits the scheduled data and the RS_ARQ_Feedback message to the destination node and the source node, respectively.

Meanwhile, the received feedback interpreter 709 interprets the received feedback information and provides information needed for generating an RS_ARQ_Feedback message so as to prevent an unnecessary data retransmission of the source node to a transmission feedback processor 711. Also, the received feedback interpreter 709 provides necessary information to the transmission data processor 707, for fast retransmission to the destination node.

The transmission feedback processor 711 processes the RS_ARQ_Feedback message based on feedback information received from the destination node and provides the processed RS_ARQ_Feedback message to the transmission data/feedback controller 713.

As is apparent from the above description, the present invention provides a feedback method and apparatus for efficiently transmitting/receiving data between a source node and a destination data in an RS in a broadband wireless communication system.

When an ARQ mechanism is used in an IEEE 802.16 OFDMA multi-hop system, the RS avoids just a simple feedback between the source node and the destination node, to thereby overcome the problem of inefficient data transmission/reception such as excess buffered data or lack of buffered data in the RS.

As retransmission of the same data from the source node to the RS is prevented, the resulting fast feedback from the RS to the source node minimizes retransmission delay.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A retransmission method in a Relay Station (RS) in a multi-hop wireless communication system, comprising:
    transmitting a first feedback message to a source node and a successfully received data block to a destination node, wherein the first feedback message requests retransmission of a failed data block when the failed data block is among data blocks received from the source node;
    receiving a retransmitted data block for the failed data block from the source node;
    receiving from the destination node a second feedback message about data blocks transmitted to the destination node and transmitting the second feedback message to the source node;
    determining whether the second feedback message indicates that a data block that the RS has successfully received from the source node was not received at the destination node through a comparison of a Block Sequence Number (BSN) of a data block received from the source node with a BSN of a data block received from the destination node; and
    when the second feedback message indicates that the data block that the RS has successfully received from the source node was not received at the destination node, transmitting the data block and the received retransmitted data block together to the destination node; and
    when the second feedback message indicates that the data block that the RS has successfully received from the source node was received at the destination node, transmitting the received retransmitted data block to the destination node.

2. The retransmission method of claim 1, wherein the second feedback message includes a Negative ACKnowledgement (NACK) for the data block.

3. The retransmission method of claim 1, further comprising generating a third feedback message about the retransmitted data block and transmitting the third feedback message to the source node.

4. The retransmission method of claim 1, wherein the first feedback message includes a type field set to a To Be Determined (TBD) value.

5. The retransmission method of claim 1, further comprising:
    comparing a first number with a second number, the first number being a lowest BSN among BSNs of data blocks received from the source node and transmitted to the destination node, and the second number being a lowest BSN among BSNs of data blocks for which feedback information is received from the destination node using a data/feedback controller; and
    retransmitting data blocks with BSNs before the second number to the destination node, if the first number is different from the second number.

6. The retransmission method of claim 5, further comprising:
    if the first number is equal to the second number, comparing, using the data/feedback controller, a third number with a fourth number, the third number being a highest BSN among the BSNs of the data blocks for which the feedback information is received from the destination node and the fourth number being a highest BSN among BSNs of data blocks received from the source node; and
    retransmitting data blocks with BSNs following the third number to the destination node, if the third number is different from the fourth number.

7. The retransmission method of claim 5, further comprising,
    if the first number is equal to the second number, comparing, using the data/feedback controller, a third number with a fourth number, the third number being a highest BSN among the BSNs of the data blocks for which the feedback information is received from the destination node and the fourth number being a highest BSN among BSNs of data blocks received from the source node;
    if the first and second numbers are equal and the third and fourth numbers are equal, generating, using the data/feedback controller, an RS Automatic Repeat reQuest (ARQ) feedback message using the first, second, third and fourth numbers and transmitting the RS ARQ feedback message to the source node.

8. A retransmission apparatus in a Relay Station (RS) in a multi-hop wireless communication system, comprising:
    a source node processor for transmitting a first feedback message to the source node, wherein the first feedback message requests retransmission of a failed data block and the source node processor receives a retransmitted data block for the failed data block from the source node when the failed data block is among data received from the source node;
    a destination node processor for transmitting a successfully received data block to a destination node and receiving from the destination node a second feedback message about data blocks transmitted to the destination node, for determining whether the second feedback message indicates that a data block that the RS has successfully received from the source node was not received at the destination node through a comparison of a Block Sequence Number (BSN) of a data block received from the source node with a BSN of a data block received from the destination node, wherein the data block and received retransmitted data block are transmitted together to the destination node when the second feedback message indicates that the data block that the RS has successfully received from the source node was not received at the destination node, and wherein the received retransmitted data block is transmitted to the destination node when the second feedback message indicates that the data block that the RS has successfully received from the source node was received at the destination node,
wherein the source node processor transmits the second feedback message to the source node.

9. The retransmission apparatus of claim 8, wherein the second feedback message includes a Negative ACKnowledgement (NACK) for the data block.

10. The retransmission apparatus of claim 8, wherein the source node processor generates a third feedback message about the retransmitted data block and transmits the third feedback message to the source node.

11. The retransmission apparatus of claim 8, wherein the first feedback message includes a type field set to a To Be Determined (TBD) value.

12. The retransmission apparatus of claim 8, further comprising:
a data/feedback controller for comparing a first number with a second number, the first number being a lowest BSN among BSNs of data blocks received from the source node and transmitted to the destination node, and the second number being a lowest BSN among BSNs of data blocks for which feedback information is received from the destination node using a data/feedback controller,
wherein the second node processor retransmits data blocks with BSNs before the second number to the destination node, if the first number is different from the second number.

13. The retransmission apparatus of claim 12,
wherein the data/feedback controller, if the first number is equal to the second number, compares a third number with a fourth number, the third number being a highest BSN among the BSNs of the data blocks for which the feedback information is received from the destination node and the fourth number being a highest BSN among BSNs of data blocks received from the source node,
wherein the second node processor retransmits data blocks with BSNs following the third number to the destination node, if the third number is different from the fourth number.

14. The retransmission apparatus of claim 12, wherein the data/feedback controller,
if the first number is equal to the second number, compares, using the data/feedback controller, a third number with a fourth number, the third number being a highest BSN among the BSNs of the data blocks for which the feedback information is received from the destination node and the fourth number being a highest BSN among BSNs of data blocks received from the source node; and
if the first and second numbers are equal and the third and fourth numbers are equal, generates an RS Automatic Repeat reQuest (ARQ) feedback message using the first, second, third and fourth numbers and transmitting the RS ARQ feedback message to the source node.

* * * * *